Jan. 4, 1944.   G. L. DIMMICK   2,338,234
EVAPORATION OF TRANSPARENT MATERIAL ON GLASS
Filed Jan. 2, 1941
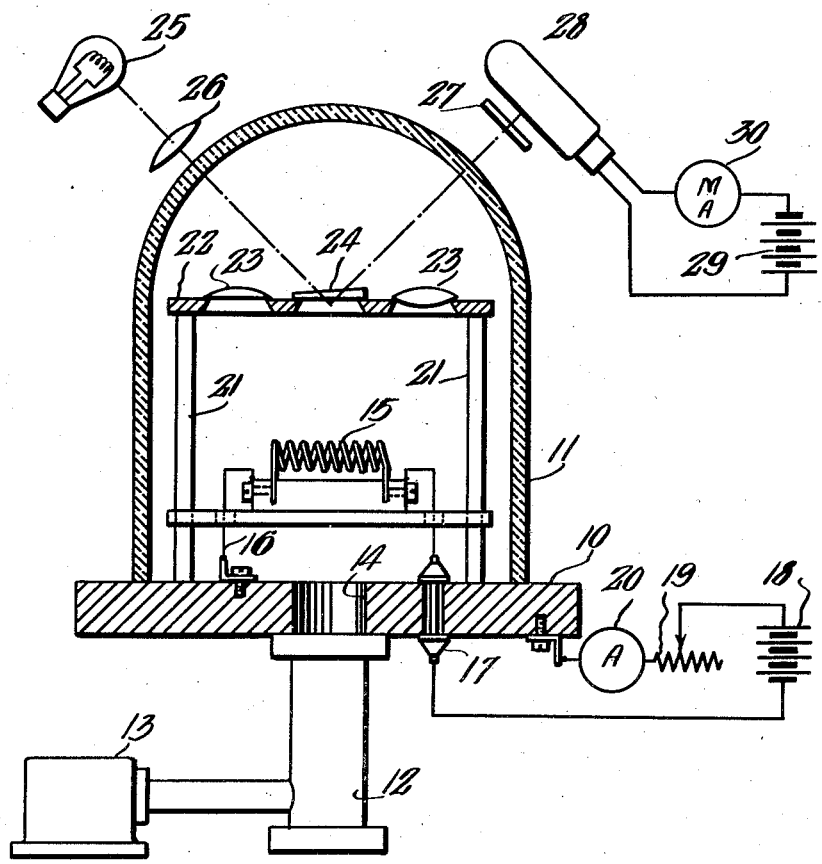
Inventor
Glenn L. Dimmick
By J. J. Huff
Attorney Patented Jan. 4, 1944

2,338,234

UNITED STATES PATENT OFFICE 2,338,234

EVAPORATION OF TRANSPARENT MATERIAL ON GLASS

Glenn L. Dimmick, Haddonfield, N. J., assignor to Radio Corporation of America, a corporation of Delaware Application January 2, 1941, Serial No. 372,811

4 Claims. (Cl. 117—106)

This invention relates to the evaporation of transparent material on glass and, more particularly, to the evaporation of materials of lower index of refraction than the glass for the purpose of reducing reflection at the glass-to-air surface.

It has been heretofore proposed to evaporate a layer of calcium fluoride or other metallic fluoride on the surface of lenses or other optical elements in order to decrease their surface reflection, and if this layer is applied to a thickness of a quarter of a wave length, the reflection may be reduced to a very small fraction of the normal reflection, which is of the order of 4 percent.

In my application Serial No. 348,815, filed July 31, 1940 (RCV Docket 7853) I have described and claimed an improvement in the coating material in that a mixture of calcium fluoride and aluminum oxide is used which produces a harder and more tenacious coating than theretofore produced. In my application Serial No. 370,758, filed December 19, 1940 (RCV Docket 8104) I have described and claimed an improved optical system wherein coatings having a thickness of an odd plurality of quarter wave lengths are used so as to produce a selective transmission in a multi-element optical system.

The present invention provides a novel method and apparatus for determining the thickness of the applied coating during the process of evaporation so that the evaporation may be stopped at the proper point. This is accomplished by transmitting a beam of light to a test plate in the apparatus, the surface of the test plate being placed in the path of the evaporated material. Light reflected from the surface is directed to a photocell, and along the path of the beam of light there is located a color filter so that the reflection of the light transmitted by that particular color filter is determined. Since the reflection varies in accordance with a sine curve, the reflection will fall continuously toward a minimum, where it will remain stationary for a moment. If the evaporation is stopped at this point, the minimum of reflection for the particular color transmitted by the filter will be achieved. If the evaporation is thereafter continued until a second minimum is reached, a similar minimum of transmission for that particular color will be achieved, but the color selectivity of the surface will be increased and the loss by reflection for other colors will be higher than if the first minimum, which corresponds to a layer thickness of a quarter wave length, is used.

One object of the invention is to provide an improved apparatus for measuring the thickness of evaporated films on transparent material.

Another object of the invention is to provide an improved method of measuring the thickness of very thin films.

Another object of the invention is to provide an apparatus for determining the point of minimum reflection of light of a particular color from the surface of a transparent material.

Other and incidental objects of the invention will be apparent to those skilled in the art from a reading of the following specification and an inspection of the accompanying drawing, in which The single figure is a vertical section through an evaporation apparatus constructed in accordance with the present invention.

The evaporation apparatus includes a heavy base 10 of appropriate material such, for example, as steel on which is mounted a bell jar 11 which may be sealed to the base by any appropriate sealing compound. A high vacuum pump 12 attached to a backing or force pump 13 is connected to the interior of the bell jar through the large aperture 14. A filament 15 is provided in the interior of which is placed the material to be evaporated. This may be placed in the filament in the form of a paste, or a small boat of the material may be placed in the filament. One end of the filament is connected to the base plate 10 through the terminal 16, while the lead from the other end passes through an appropriate insulating connection 17 in the base 10 to the source of current 18. The current applied to the filament may be adjusted by the resistor 19 and measured by the ammeter 20 in the usual manner, the return lead from the ammeter being connected, of course, to the base 10.

The supports 21 carry a supporting member 22 an appropriate distance from the filament 15, this distance being so chosen that uniform distribution of the evaporated material will be secured. The objects to be coated, indicated at 23, are supported on the member 22. The evaporated material passes through holes in the member 22 to the surfaces of the objects 23. A test wedge 24 is similarly placed over a hole in the member 22 and serves to provide the indication of the thickness of the deposited film.

Light from the source 25 which may be an incandescent lamp, preferably of the type used as an exciter lamp in film sound reproducing apparatus, is directed by the condenser 26 onto the wedge 24. The upper surface of the wedge 24 is located at such an angle that light reflected therefrom will not reach the filter 27. Light reflected from the lower surface of the wedge 24, however, is directed through the color filter 27 onto the photocell 28. It will be noticed that the photocell 28 is so located that light from the filament 15 will not reach it and, if used in a lighted room, the photocell 28 would be appropriately enclosed as well as being shielded from direct light from the source 25. The photocell is provided with an appropriate source of current 29 and with an appropriate meter 30 for measuring the current therethrough. If the usual alkali metal type of photocell is used, the meter 30 will be a microammeter. The color filter 27 is chosen so as to transmit light of the wave length for which the minimum reflection is desired.

The lamp 25 and the photocell 28, together with its attendant filter, are made movable in a vertical arc about the bell jar so that the angle of incidence of the light may be varied and the reflected beam may be picked up. If the surfaces to be coated are of such a nature that the average angle of incidence of the light is to be 45°, then the lamp and photo-cell would be arranged approximately as shown at angles of 45° to the normal to the bottom surface of the wedge.24. If a lens of relatively small angular aperture is to be coated or, similarly, if an optical element which is to be used at a small angle to the average angle of incidence of the light is to be coated, the lamp and photocell are moved upwardly until the angle of incidence and reflection correspond.

The manner of operation of the apparatus is as follows: The elements to be coated 23 and the wedge 24 are placed in position after the filament 15 has been charged with the coating material and the bell jar 11 is evacuated to an appropriate degree. The filament 15 is then heated with the exciter lamp 25 in operation, and the current through the microammeter 30 is observed. This current will fall at first rather slowly as the filament 15 approaches the proper temperature and then more rapidly as the material evaporates at a substantially continuous rate. The rate of fall of the current through the microammeter will gradually decrease until the current momentarily reaches a practically stationary value, after which it will again start to rise. If the current to the filament 15 is cut off just as the microammeter tends to become stationary, a coating will be produced on the element having a thickness of a quarter of a wave length of the average light transmitted by the filter 27. A slight allowance must be made for the fact that the filament 15 and its charge do not cool instantaneously, and the evaporation proceeds at a decreasing rate for a few seconds after the current is turned off through the filament.

If it is desired to coat the surfaces to a greater thickness, which is an odd plurality of quarter wave lengths, the same procedure is followed, but after passing through the first minimum, the current through the microammeter 30 will be observed to again rise and will fall to a second minimum at three quarter wave lengths, a third minimum at five quarters, etc.

It will be apparent that my invention is not limited to the use of an alkali metal photocell, but any type of photocell with sufficient sensitivity of the light under consideration may be used, and any appropriate type of light source may be used in place of the incandescent lamp 25.

It will be apparent that the apparatus may be used to determine the thickness of the film on the lens or other element directly, although the use of the wedge is preferred.

Any other type of light separating device may be used instead of the filter, if desired. For example, a monochromator may be substituted if desired.

Having now described my invention, I claim:

1. The method of providing an evaporated coating of minimum reflection on a refractive medium comprising the steps of directing a light beam onto a surface of a refractive material in an evaporating apparatus, directing the reflected portion of said beam through a color selective filter onto a photocell, determining the current through the photocell, evaporating said material onto said surface, and stopping the said evaporation when the current through the photocell reaches a momentarily stationary value.

2. The method of providing a transparent coating of minimum reflection on a refractive medium comprising the steps of directing a light beam onto a surface of a refractive material in a coating apparatus, directing the reflected portion of said beam through a color selective filter onto a photocell, determining the current through the photocell, evaporating said material onto said surface, and stopping the said coating when the current through the photocell reaches a momentarily stationary value.

3. The method of providing an evaporated coating of minimum reflection on a refractive medium comprising the steps of directing a light beam onto a surface of a refractive material in an evacuated evaporating apparatus, directing the reflected portion of said beam through a color selective filter onto a photocell, determining the current through the photocell, evaporating said material onto said surface, and stopping the said evaporation when the current through the photocell reaches a momentarily stationary value.

4. The method of providing an evaporated coating of minimum reflection on a refractive medium comprising the steps of directing a light beam onto a surface of a refractive material in an evaporating apparatus, directing the reflected portion of said beam onto a photocell, determining the current through the photocell, evaporating said material onto said surface, and stopping the said evaporation when the current through the photocell reaches a momentarily stationary value.

GLENN L. DIMMICK